US008180470B2

(12) United States Patent
Pahuja

(10) Patent No.: US 8,180,470 B2
(45) Date of Patent: May 15, 2012

(54) SYSTEMS AND METHODS FOR FINE ALIGNMENT OF ANALOG AND DIGITAL SIGNAL PATHWAYS

(75) Inventor: Ashwini Pahuja, Albertson, NY (US)

(73) Assignee: iBiquity Digital Corporation, Columbia, MD (US)

( * ) Notice: Subject to any disclaimer, the term of this patent is extended or adjusted under 35 U.S.C. 154(b) by 958 days.

(21) Appl. No.: 12/219,989

(22) Filed: Jul. 31, 2008

(65) Prior Publication Data

US 2010/0027719 A1 Feb. 4, 2010

(51) Int. Cl.
*G06F 17/00* (2006.01)
*H04B 1/00* (2006.01)
*H04N 7/12* (2006.01)

(52) U.S. Cl. ........ 700/94; 455/61; 455/137; 375/240.28
(58) Field of Classification Search ............... 700/94; 370/350, 503–519; 381/1–16; 455/59, 61, 455/143; 375/240.28, 371
See application file for complete search history.

(56) References Cited

U.S. PATENT DOCUMENTS

| 6,148,008 A * | 11/2000 | Okamoto ................. 455/132 |
| 6,178,317 B1 | 1/2001 | Kroeger et al. |
| 6,353,637 B1 * | 3/2002 | Mansour et al. .............. 455/513 |
| 6,590,944 B1 * | 7/2003 | Kroeger ....................... 375/340 |
| 6,735,257 B2 | 5/2004 | Kroeger |
| 6,891,898 B2 | 5/2005 | Peyla et al. |
| 2001/0003089 A1 | 6/2001 | Kroeger et al. |
| 2004/0043730 A1 * | 3/2004 | Schill et al. .................... 455/130 |
| 2006/0019601 A1 | 1/2006 | Kroeger et al. |
| 2006/0227814 A1 * | 10/2006 | Iannuzzelli et al. .......... 370/516 |

OTHER PUBLICATIONS

International Search Report dated Sep. 18, 2009 from corresponding International Application No. PCT/US2009/004387.
Written Opinion of the International Searching Authority dated Sep. 18, 2009 from corresponding International Application No. PCT/US2009/004387.
National Association of Broadcasters—National Radio Systems Committee, "NRSC-5-A In-band/on-channel Digital Radio Broadcasting Standard", Sep. 2005, pp. 1-36, "http://www.nrscstandards.org.".
Steven Johnson, "The Structure and Generation of Robust Waveforms for AM In Band On Channel Digital Broadcasting," Oct. 15, 2006, pp. 1-10, "http://www.ibiquity.com/broadcasters/quality_implementation/iboc_white_papers".
Paul Peyla, "The Structure and Generation of Robust Waveforms for FM In-Band On-Channel Digital Broadcasting," Oct. 15, 2006, pp. 1-17, "http://www.ibiquity/broadcasters/quality_implementation/iboc_white_papers".

* cited by examiner

*Primary Examiner* — Jesse Elbin
(74) *Attorney, Agent, or Firm* — Jones Day

(57) ABSTRACT

Methods and systems lor temporally aligning audio samples of digital and analog portions ol a radio broadcast signal involve receiving a radio broadcast signal having analog and digital portions; separating the analog and digital portions; retrieving a stored first time interval of an approximate time for a sample of the digital portion to travel through a digital signal path in a receiver including a digital demodulator; measuring a second time lor the sample of the digital portion to travel from an input of the digital signal path to an input of the digital demodulator; generating a delay amount by adding the first time to the second time; delaying second audio samples of the digital portion by tho delay amount relative to first audio samples of tho analog portion such that the second audio samples are temporally aligned with the first audio samples; and combining ihe first and second audio samples.

21 Claims, 13 Drawing Sheets

SYSTEMS AND METHODS FOR FINE ALIGNMENT OF ANALOG AND DIGITAL SIGNAL PATHWAYS

BACKGROUND

1. Field of the Disclosure

The present disclosure relates to radio broadcast receivers and, in particular, to methods and systems for fine alignment of analog and digital signal pathways in a radio receiver.

2. Background Information

Digital radio broadcasting technology delivers digital audio and data services to mobile, portable, and fixed receivers. One type of digital radio broadcasting, referred to as in-band on-channel (IBOC) digital radio broadcasting, uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC digital radio broadcasting signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC digital radio broadcasting can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content over IBOC digital radio broadcasting transmissions can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an BOO standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the Consumer Electronics Association, Technology & Standards Department, 1919 S. Eads St., Arlington, Va. 22202 and the National Association Of Broadcasters, Science and Technology Department, 1771 N Street, NW, Washington, D.C. 20036. iBiquity's HD Radio technology is an implementation of the NRSC-5A IBOC standard. Further information regarding HD Radio technology can be obtained from iBiquity Digital Corporation, 6711 Columbia Gateway Drive, Suite 500, Columbia, Md. 21046.

Other types of digital radio broadcasting systems include satellite systems such as Satellite Digital Audio Radio Service (SDARS, e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Radio signals are subject to intermittent fades or blockages that must be addressed in broadcasting systems. Conventionally, FM radios mitigate the effects of fades or partial blockages by transitioning from full stereophonic audio to monophonic audio. Some degree of mitigation is achieved because the stereo information which is modulated on a sub-carrier, requires a higher signal-to-noise ratio to demodulate to a given quality level than does the monophonic information which is at the base band. However, there are some blockages which sufficiently "take out" the base band and thereby produce a gap in the reception of the audio signal. IBOC DAB systems can mitigate even those latter type outages in conventional analog broadcast, at least where such outages are of an intermittent variety and do not last for more than a few seconds. To accomplish that mitigation, digital audio broadcasting systems may employ the transmission of a primary broadcast signal along with a redundant signal (e.g. a digital OFDM signal and an analog AM or FM signal), the redundant signal being delayed by a predetermined amount of time, on the order of several seconds, with respect to the primary broadcast signal. A corresponding delay is incorporated in the receiver for delaying the received primary broadcast signal. A receiver can detect degradation in the primary broadcast channel that represents a fade or blockage in the RF signal, before such is perceived by the listener. In response to such detection, the delayed redundant signal can be temporarily substituted for the corrupted primary audio signal, acting as a "gap filler" when the primary signal is corrupted or unavailable. This provides a transition function for smoothly transitioning from the primary audio signal to the delayed redundant signal.

One example of transitioning from a digital signal to an analog, time delayed audio signal is described in U.S. Pat. No. 6,178,317. Additionally, U.S. Pat. No. 6,590,944 describes a technique for aligning the digital portion of the radio broadcast signal with the analog portion of the radio broadcast signal using a delay control that provides a DAB signal processing method including diversity delay, interpolation, and blend functions that can be implemented using programmable DSP chips operating in non-real-time. The inventors of the present disclosure have found that it may be desirable to align digital and analog signals in real time, without interpolation, and/or to a higher degree of alignment, e.g., within +/−three audio samples of accuracy.

SUMMARY

Embodiments of the present disclosure are directed to systems and methods that may satisfy this need. According to exemplary embodiments, a method of temporally aligning audio samples of a digital portion of a radio broadcast signal with audio samples of an analog portion of the radio broadcast signal is disclosed. The method comprises the steps of: receiving a radio broadcast signal having an analog portion and a digital portion; separating the analog portion of the radio broadcast signal from the digital portion of the radio broadcast signal; producing a first plurality of audio samples representative of the analog portion of the radio broadcast signal; retrieving from a memory a stored first time interval corresponding to an approximate time for data representing a first sample of the digital portion to travel through a digital signal path in a receiver, wherein the digital signal path includes a digital demodulator; measuring a second time for data representing the first sample of the digital portion to travel from an input of the digital signal path to an input of the digital demodulator; generating a delay amount for delaying a second plurality of audio samples relative to the first plurality of audio samples such that the second plurality of audio samples is temporally aligned with the first plurality of audio samples by adding the first time to the second time; producing the second plurality of audio samples representative of the digital portion of the radio broadcast signal; delaying the second plurality of audio samples by the delay amount such that the second plurality of audio samples is temporally aligned to within a predetermined amount with the first plurality of audio samples; and digitally combining the first plurality of audio samples with the second plurality of audio samples to produce a combined audio output.

A system comprising a processing system and a memory coupled to the processing system are described wherein the processing system is configured to carry out the above-described method. Computer programming instructions adapted to cause a processing system to carry out the above-described method may be embodied within any suitable computer readable medium.

BRIEF DESCRIPTION OF THE DRAWINGS

These and other features, aspects, and advantages of the present disclosure will become better understood with regard to the following description, appended claims, and accompanying drawings wherein:

DETAILED DESCRIPTION OF EXEMPLARY EMBODIMENTS

FIGS. 1-7 and the accompanying description herein provide a general description of an exemplary IBOC system, exemplary broadcasting equipment structure and operation, and exemplary receiver structure and operation. FIGS. 8-11 and the accompanying description herein provide a detailed description of exemplary approaches for temporally aligning digital and analog signals in a digital radio broadcast receiver. Whereas aspects of the disclosure are presented in the context of an exemplary IBOC system, it should be understood that the present disclosure is not limited to IBOC systems and that the teachings herein are applicable to other forms of digital and analog radio broadcasting as well. Furthermore, embodiments of the present disclosure may be applicable to both AM and FM analog signals.

Figure 1:
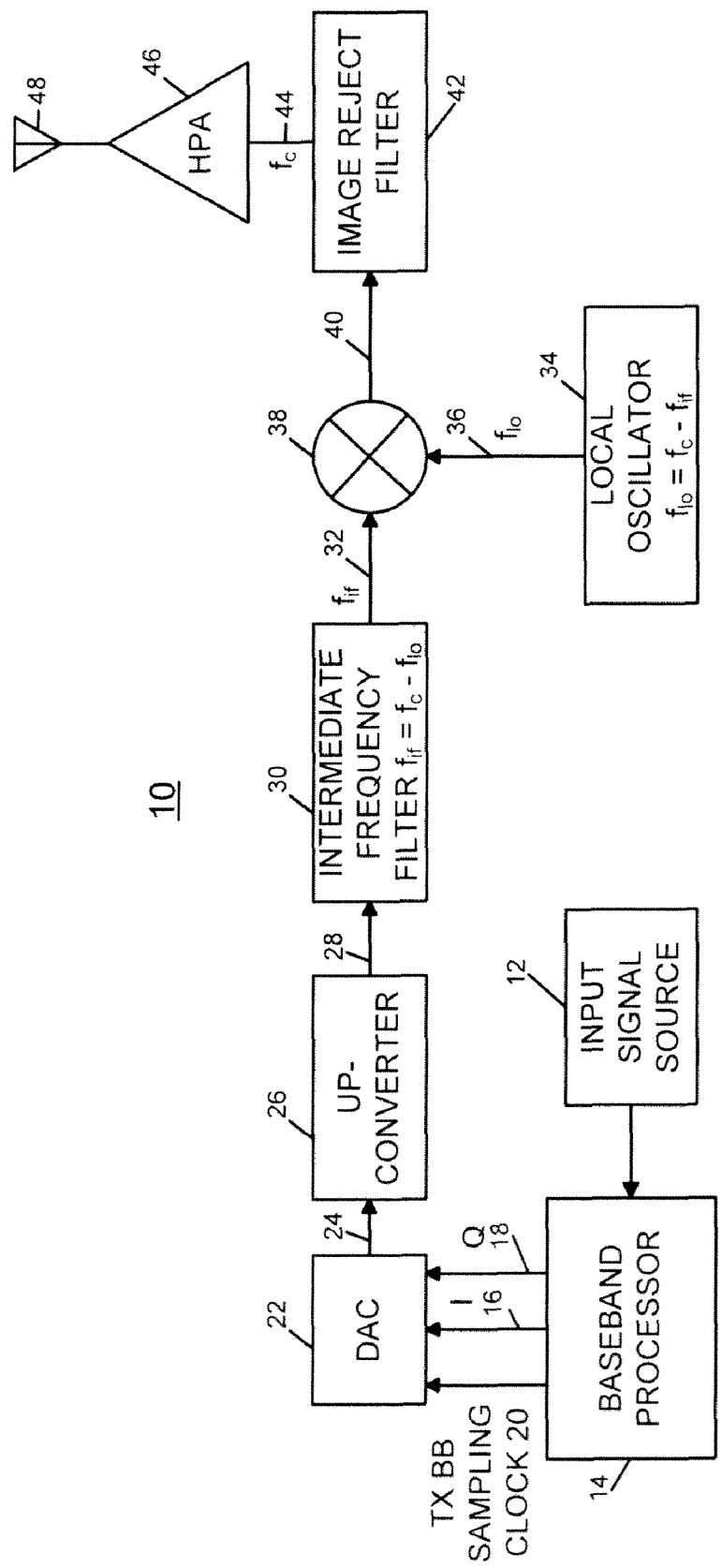
FIG. 1 illustrates a block diagram of an exemplary digital radio broadcast transmitter in accordance with certain embodiments.

Referring to the drawings, FIG. 1, is a block diagram of an exemplary digital radio broadcast transmitter 10 that broadcasts digital audio broadcasting signals. The exemplary digital radio broadcast transmitter may be a DAB transmitter such as an AM or FM IBOC transmitter, for example. An input signal source 12 provides the signal to be transmitted. The source signal may take many forms, for example, an analog program signal that may represent voice or music and/or a digital information signal that may represent message data such as traffic information. A baseband processor 14 processes the source signal in accordance with various known signal processing techniques, such as source coding, interleaving and forward error correction, to produce in-phase and quadrature components of a complex baseband signal on lines 16 and 18, and to produce a transmitter baseband sampling clock signal 20. Digital-to-analog converter (DAC) 22 converts the baseband signals to an analog signal using the transmitter baseband sampling clock 20, and outputs the analog signal on line 24. The analog signal is shifted up in frequency and filtered the up-converter block 26. This produces an analog signal at an intermediate frequency $f_{if}$ on line 28. An intermediate frequency filter 30 rejects alias frequencies to produce the intermediate frequency signal $f_{if}$ on line 32. A local oscillator 34 produces a signal $f_{lo}$ on line 36, which is mixed with the intermediate frequency signal on line 32 by mixer 38 to produce sum and difference signals on line 40. The unwanted intermodulation components and noise are rejected by image reject filter 42 to produce the modulated carrier signal $f_c$ on line 44. A high power amplifier (HPA) 46 then sends this signal to an antenna 48.

In one example, a basic unit of transmission of the DAB signal is the modem frame, which is typically on the order of a second in duration. Exemplary AM and FM IBOC DAB transmission systems arrange the digital audio and data in units of modem frames. In some embodiments, the systems are both simplified and enhanced by assigning a fixed number of audio frames to each modem frame. The audio frame period is the length of time required to render, e.g., play back audio for a user, the samples in an audio frame. For example, if an audio frame contains 1024 samples, and the sampling period is 22.67 μsec, then the audio frame period would be approximately 23.2 milliseconds. A scheduler determines the total number of bits allocated to the audio frames within each modem frame. The modem frame duration is advantageous because it may enable sufficiently long interleaving times to mitigate the effects of fading and short outages or noise bursts such as may be expected in a digital audio broadcasting system. Therefore the main digital audio signal can be processed in units of modem frames, and audio processing, error mitigation, and encoding strategies may be able to exploit this relatively large modem frame time without additional penalty.

In typical implementations, an audio encoder may be used to compress the audio samples into audio frames in a manner that is more efficient and robust for transmission and reception of the IBOC signal over the radio channel. The audio encoder encodes the audio frames using the bit allocation for each modem frame. The remaining bits in the modem frame are typically consumed by the multiplexed data and overhead. Any suitable audio encoder can initially produce the compressed audio frames such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each modem frame could include 64 audio frames. In other typical implementations, each audio frame could be comprised of a single block of 2048 audio samples, and each modem frame could include 32 audio frames. Any other suitable combination of sample block sizes and audio frames per modem frame could be utilized.

In an exemplary IBOC DAB system, the broadcast signal includes main program service (MPS) audio, MPS data (MPSD), supplemental program service (SPS) audio, and SPS data (SPSD). MPS audio serves as the main audio programming source. In hybrid modes, it preserves the existing analog radio programming formats in both the analog and digital transmissions. MPSD, also known as program service data (PSD), includes information such as music title, artist, album name, etc. Supplemental program service can include supplementary audio content as well as PSD. Station Information Service (SIS) is also provided, which comprises station information such as call sign, absolute time, position correlated to GPS, data describing the services available on the station. In certain embodiments, Advanced Applications Services (AAS) may be provided that include the ability to deliver many data services or streams and application specific content over one channel in the AM or FM spectrum, and enable stations to broadcast multiple streams on supplemental or sub-channels of the main frequency.

IBOC DAB signals can be transmitted in both AM and FM radio bands, using a variety of waveforms. The waveforms include an FM hybrid IBOC DAB waveform, an FM all-digital IBOC DAB waveform (not shown), an AM hybrid IBOC DAB waveform, and an AM all-digital IBOC DAB waveform (not shown).

Figure 2:
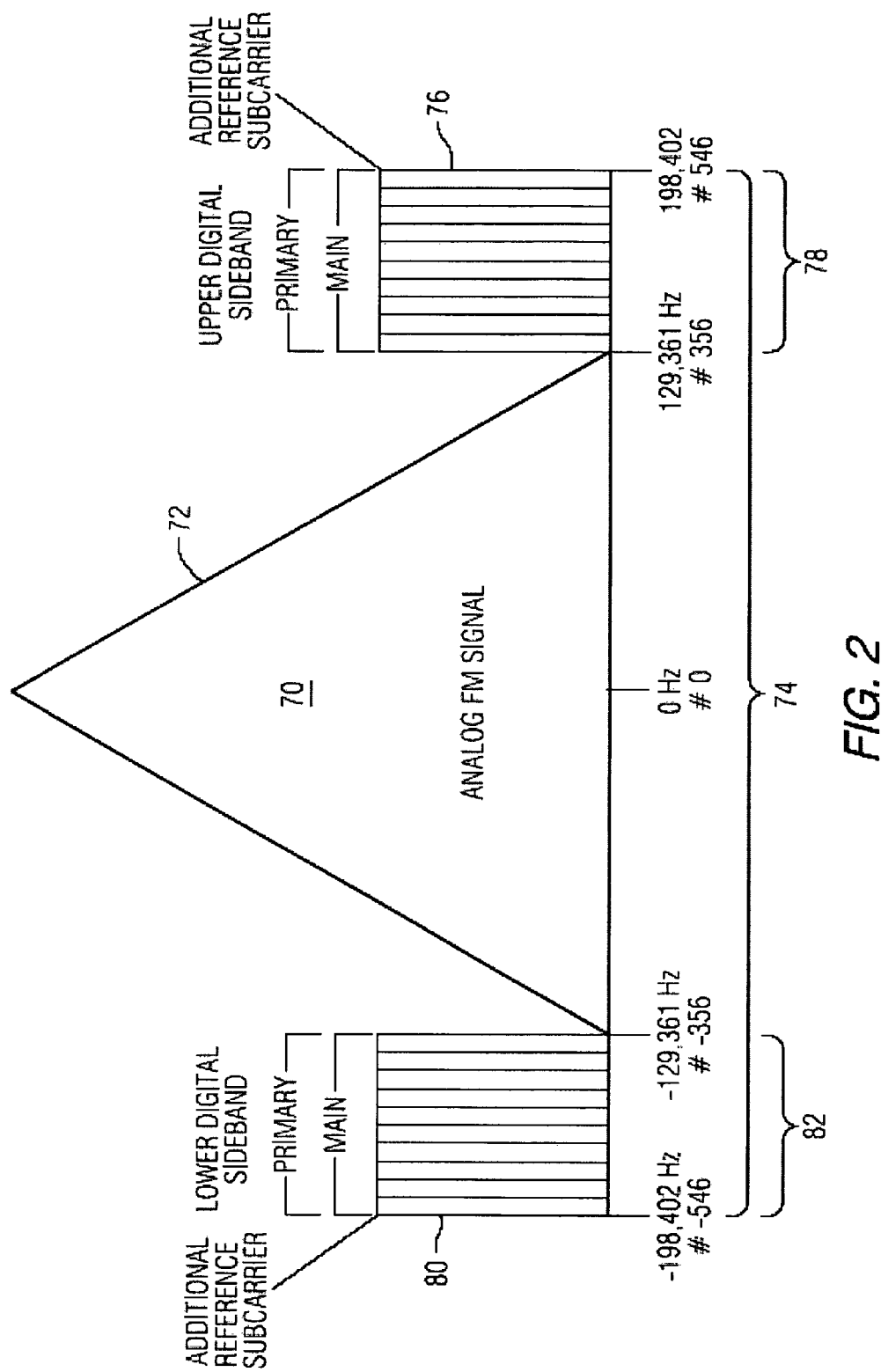
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 orthogonal frequency division multiplexing (OFDM) subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
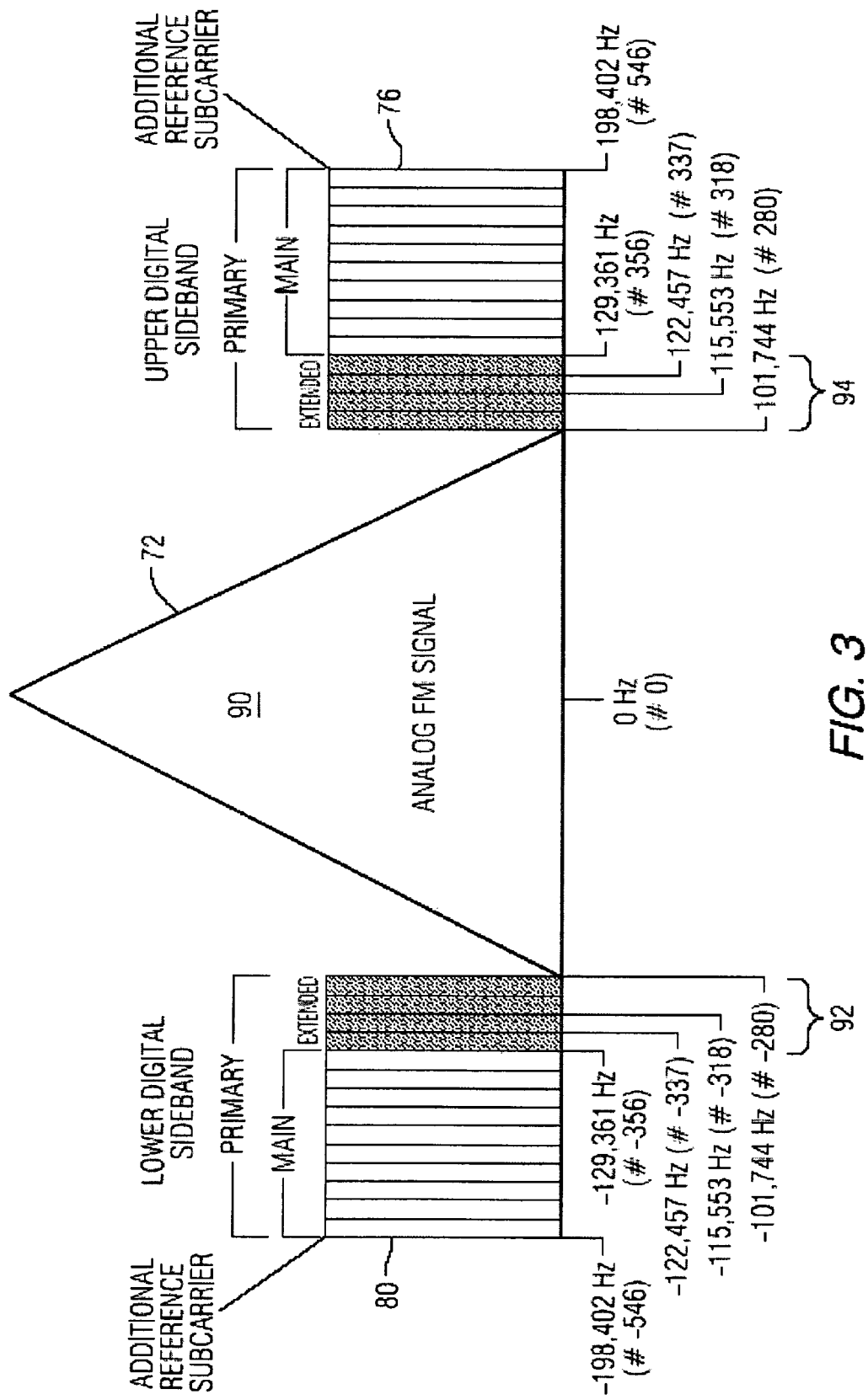
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

Figure 4:
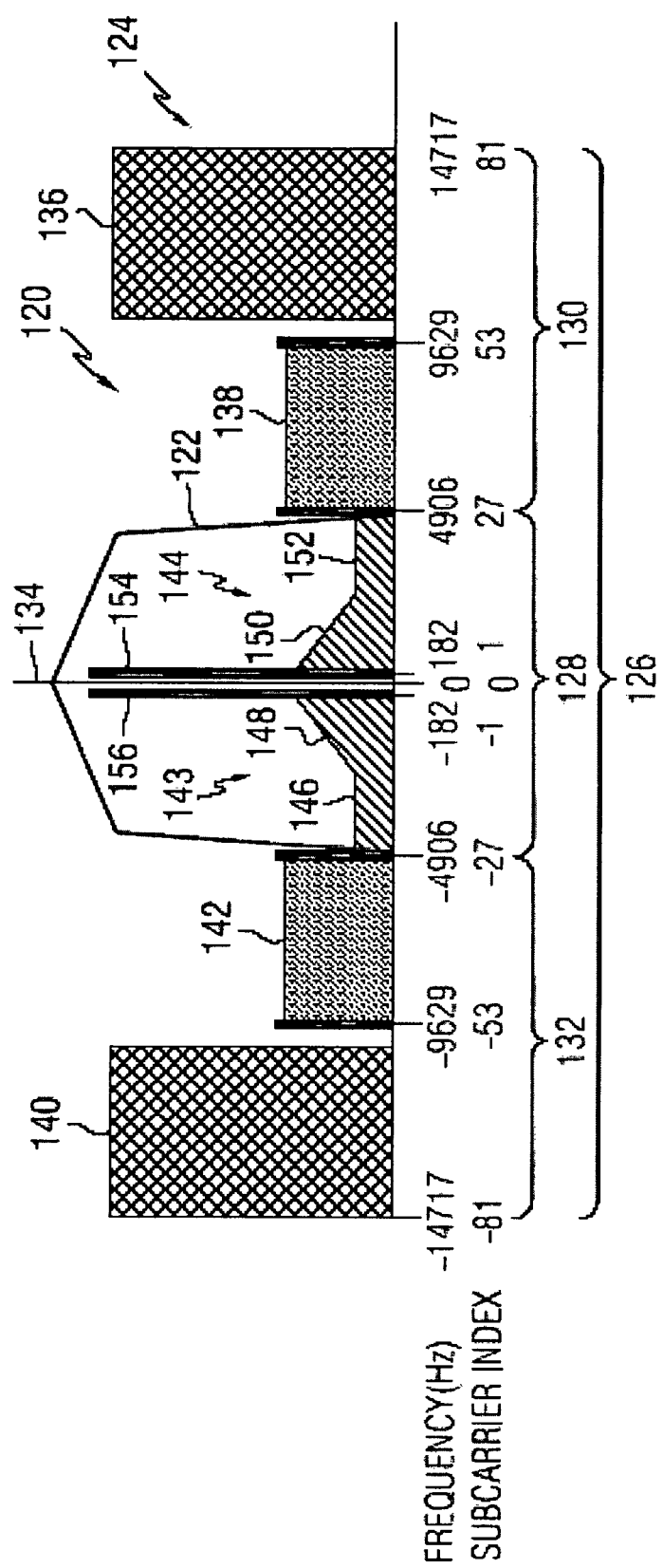
FIG. 4 is a schematic representation of a hybrid AM IBOC DAB waveform.

FIG. 4 is a schematic representation of an AM hybrid IBOC DAB waveform 120. The hybrid format includes the conventional AM analog signal 122 (bandlimited to about +5 kHz) along with a nearly 30 kHz wide DAB signal 124. The spectrum is contained within a channel 126 having a bandwidth of about 30 kHz. The channel is divided into upper 130 and lower 132 frequency bands on either side of the center frequency band 128 having the AM analog signal 122. The upper band extends from the center frequency band of the channel to about +15 kHz from the center frequency. The lower band extends from the center frequency band to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 4, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 4. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 4 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 4, the analog modulated carrier and the digitally modulated subcarriers are transmitted within the channel mask specified for standard AM broadcasting in the United States. The hybrid system uses the analog AM signal for tuning and backup.

Figure 5A:
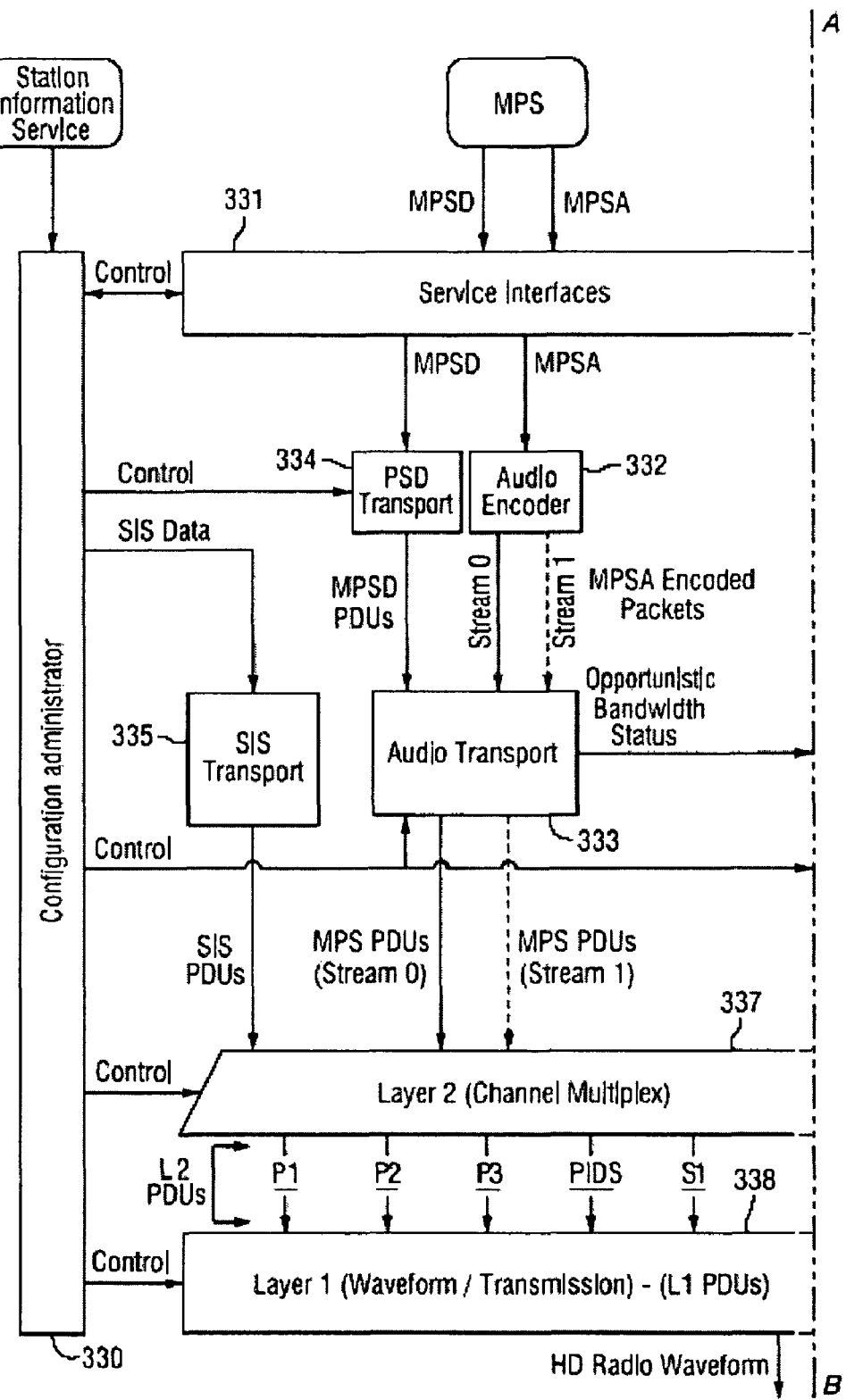
FIGS. 5a and 5b are diagrams of an IBOC DAB logical protocol stack from the broadcast perspective.
Figure 5B:
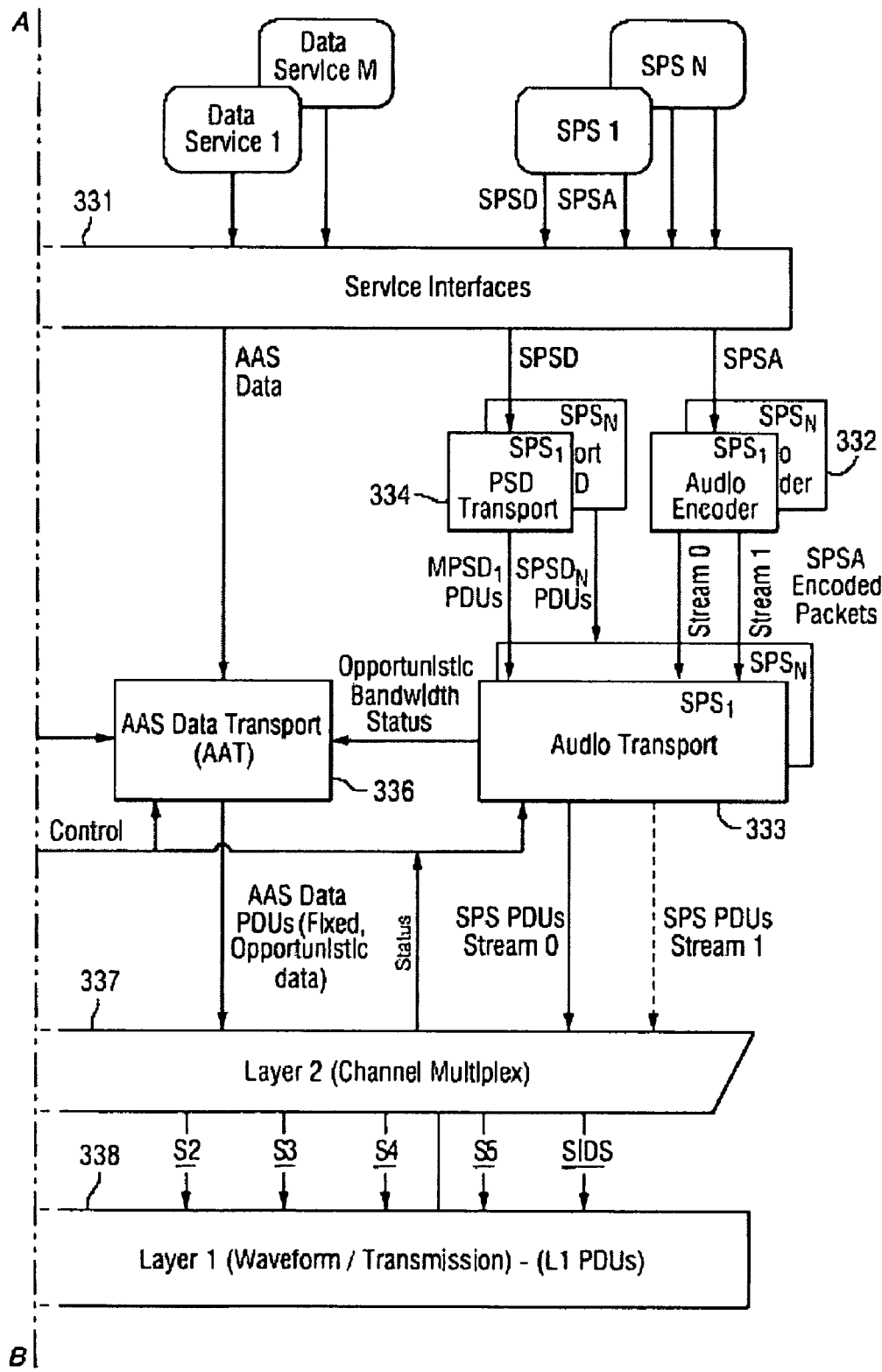

FIGS. 5a and 5b are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 5a and 5b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 6:
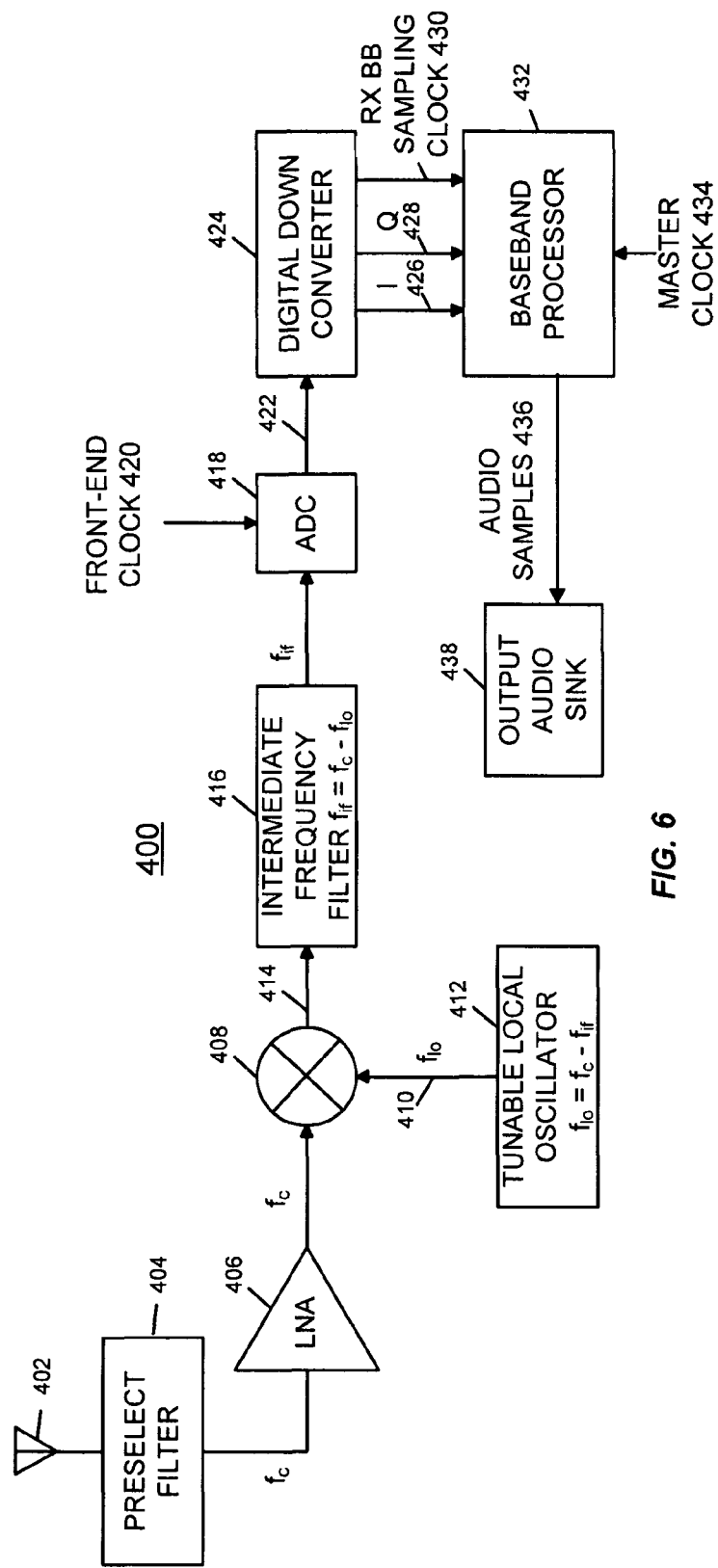
FIG. 6 illustrates a block diagram of an exemplary digital radio broadcast receiver in accordance with certain embodiments.

A digital radio broadcast receiver performs the inverse of some of the functions described for the transmitter. FIG. 6 is a block diagram of an exemplary digital radio broadcast receiver 400. The exemplary digital radio broadcast receiver 400 may be a DAB receiver such as an AM or FM IBOC receiver, for example. The DAB signal is received on antenna 402. A bandpass preselect filter 404 passes the frequency band of interest, including the desired signal at frequency $f_c$, but rejects the image signal at $f_c - 2f_{if}$ (for a low side lobe injection local oscillator). Low noise amplifier (LNA) 406 amplifies the signal. The amplified signal is mixed in mixer 408 with a local oscillator signal $f_{lo}$ supplied on line 410 by a tunable local oscillator 412. This creates sum ($f_c + f_{lo}$) and difference ($f_c - f_{lo}$) signals on line 414. Intermediate frequency filter 416 passes the intermediate frequency signal $f_{if}$ and attenuates frequencies outside of the bandwidth of the modulated signal of interest. An analog-to-digital converter (ADC) 418 operates using the front-end clock 420 to produce digital samples on line 422. Digital down converter 424 frequency shifts, filters and decimates the signal to produce lower sample rate in-phase and quadrature signals on lines 426 and 428. The digital down converter 424 also outputs a receiver baseband sampling clock signal 430. A baseband processor 432, operating using the master clock 434 that may or may not be generated from the same oscillator as the front-end clock 420, then provides additional signal processing. The baseband processor 432 produces output audio samples on line 436 for output to audio sink 438. The output audio sink may be any suitable device for rendering audio such as an audio-video receiver or car stereo system.

Figure 7:
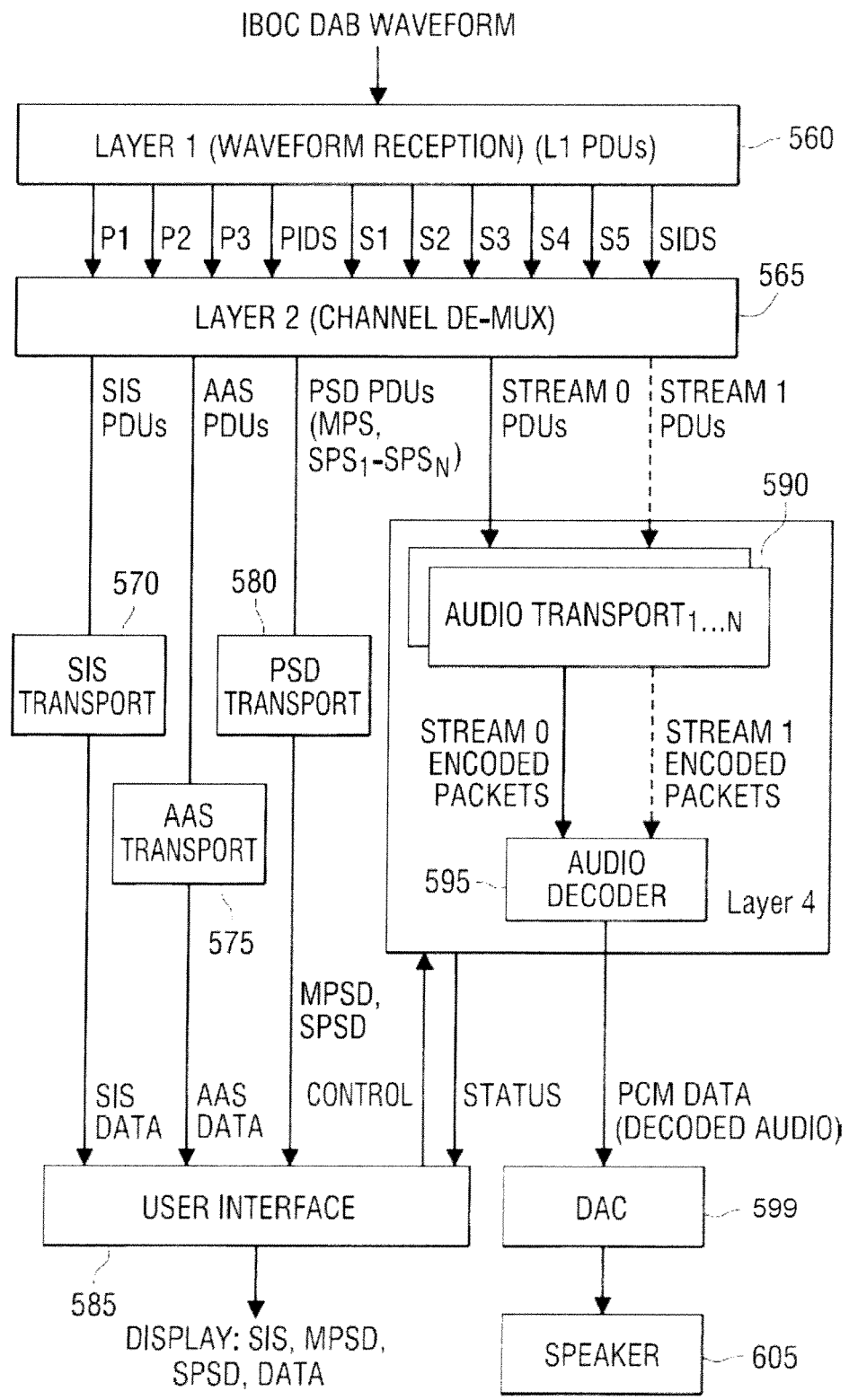
FIG. 7 is a diagram of an IBOC DAB logical protocol stack from the receiver perspective.

FIG. 7 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P 1-P 3, Primary IBOC Data Service Logical Channel (PIDS), S 1-S 5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. The audio decoder 595 transmits the PCM data (decoded audio) to a DAC 599, which outputs analog audio to speaker 605. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

As previously discussed, IBOC digital radio broadcasting signals can be transmitted in a hybrid format that includes an analog modulated carrier (e.g., frequency modulated (FM) or amplitude modulated (AM)) in combination with a plurality of digitally modulated carriers (e.g., orthogonal frequency division multiplexing (OFDM) sub-carriers). Thus the digital radio broadcast receiver operating in hybrid mode decodes both an analog portion (e.g., FM or AM) and a digital portion (e.g., OFDM) of the digital radio broadcast audio signal.

In the absence of the digital portion of the digital radio broadcast audio signal (for example, when the channel is initially tuned, or when a channel outage occurs), the analog AM or FM backup audio signal is fed to the audio output. When the digital signal becomes available, the baseband processor 432 implements a transition function to smoothly attenuate and eventually remove the analog backup signal while adding in the digital audio signal such that the transition is minimally noticeable.

Similar transitioning occurs during channel outages which corrupt the digital signal. The corruption may be detected during the diversity delay time through cyclic redundancy checking (CRC) error detection means. In this case the analog signal is gradually transitioned into the output audio signal while attenuating the DAB signal such that the audio is fully transitioned to analog when the digital corruption appears at the audio output. Furthermore, the receiver outputs the analog audio signal whenever the digital signal is not present.

In an exemplary digital audio broadcasting receiver, the analog backup signal is detected and demodulated producing a 44.1 kHz audio sample stream (stereo in the case of FM which can further blend to mono or mute under low SNR conditions). At 44.1 kHz, each audio sample is approximately 22.67 μsec in duration. The 44.1 kHz sample rate is synchronous with the receiver's front-end clock 420. The audio sample decoder in the baseband processor 432 also generates audio samples at approximately 44.1 kHz. Minute differences in the 44.1 kHz clocks between the transmitter and receiver prevent simple one-to-one combining of the analog signal samples with the digital signal samples since the audio content may start at different points and eventually drift apart over time. The maintenance of synchronization between the receiver and the transmitter clock is not a part of this disclosure but is desirable in maintaining alignment of the audio samples.

The transmitter baseband processor 14 arranges digital information into successive modem frames. Each modem frame may be considered to consist of a number of audio frames, for example 32 audio frames. Thus the modem frame duration contains symbols from, for example, 32 audio frames (a total period of about 1.486 seconds). The leading edge of the modem frame is aligned with the leading edge of audio frame 0 (modulo 32). The leading edge of the analog backup signal is transmitted after the equivalent leading edge of the first audio frame by exactly the diversity delay. The leading edge of the analog backup signal is defined herein as the audio sample of the analog (FM) signal that corresponds to the first sample of the leading audio frame—i.e., the start of the modem frame. The diversity delay is typically a defined integer multiple of modem frames. The diversity delay is typically designed to be significantly greater than the processing delays introduced by the digital processing in a digital radio broadcast system, the delay being greater than 2.0 seconds, and preferably within a 3.0-5.0 second range.

Figure 8:
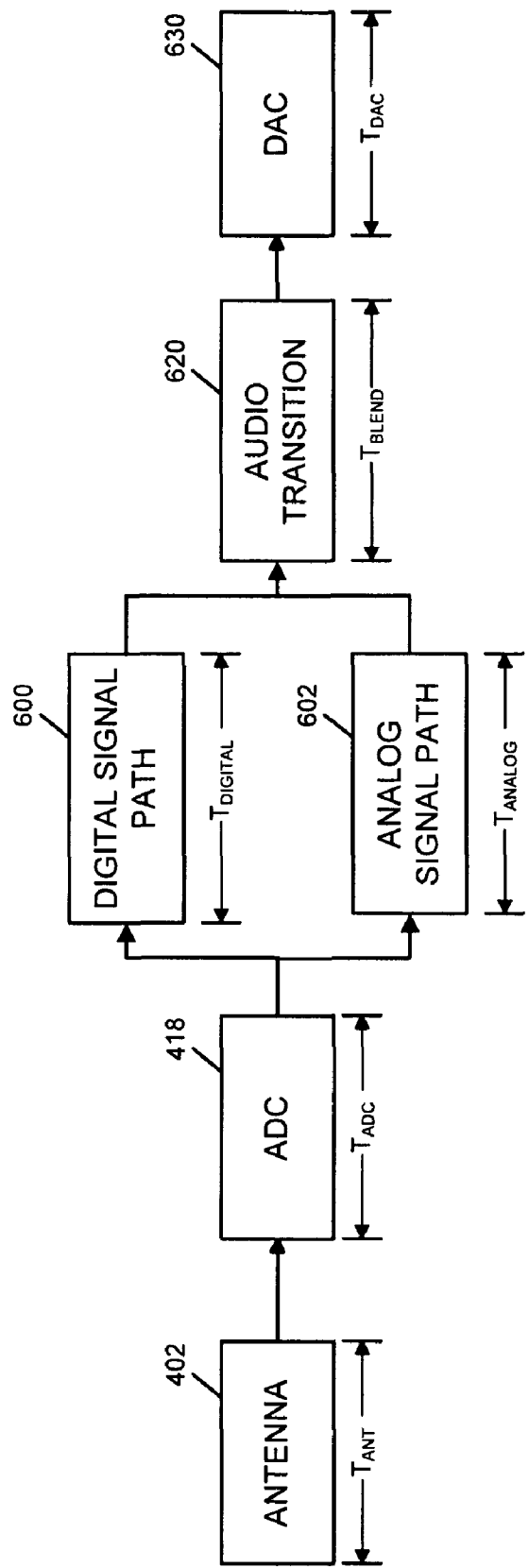
FIG. 8 illustrates a timing block diagram of an exemplary digital broadcast receiver in accordance with certain embodiments.

FIG. 8 is an exemplary block diagram that illustrates the times involved in aligning the digital portion with the analog portion of the audio signal. When a hybrid radio broadcast signal enters the receiver, it first travels through the antenna 402, where it spends an amount of time $T_{ANT}$. $T_{ANT}$ is typically a constant amount of time that will be implementation dependent. Next the signal will travel through the ADC 418 as described above, where it spends an amount of time $T_{ADC}$. $T_{ADC}$ is also typically a constant amount of time that will be implementation dependent. The hybrid signal is then split into a digital signal path 600 and an analog signal path 602. In the digital signal path 600, the digital signal is acquired, demodulated, and decoded into digital audio samples as described in more detail below. The digital signal spends an amount of time $T_{DIGITAL}$ in the digital signal path 600, which is a variable amount of time that will depend on the acquisition time of the digital signal and the demodulation and decoding times of the digital signal path. The acquisition time can vary depending on the strength of the digital signal due to radio propagation interference such as fading and multipath.

In contrast, the analog signal (i.e., the digitized analog audio samples) spends an amount of time $T_{ANALOG}$ in the analog signal path 602. $T_{ANALOG}$ is typically a constant amount of time that is implementation dependent. It should be noted that the analog signal path 602 may be co-located on the baseband processor 432 or separately located on an independent analog processing chip. Since the time spent traveling through the digital signal path $T_{DIGITAL}$ and the analog signal path $T_{ANALOG}$ may be different, it is desirable to align the samples from the digital signal with the samples from the analog signal within a predetermined amount so that they can be smoothly combined in the audio transition module 620. To align the digital signal with the analog signal implies that $T_{ANALOG}=T_{DIGITAL}$. In preferred embodiments, the alignment will be within +/−3 samples (e.g., within 68.1 μsec if each sample is 22.67 μsec). Other alignment accuracies may be suitable depending on the specific implementation such as, for example, +/−5 samples or +/−10 samples. However, the alignment accuracy will preferably be chosen to minimize the introduction of audio distortions. The digital and analog signals are combined and travel through the audio transition module 620 in a constant amount of time $T_{TRANSITION}$. Finally, the combined digitized audio signal is converted into analog for rendering via the digital-to-analog converter (DAC) 630, where it spends time $T_{DAC}$. $T_{DAC}$ is also typically a constant amount of time that will be implementation dependent.

Figure 9:
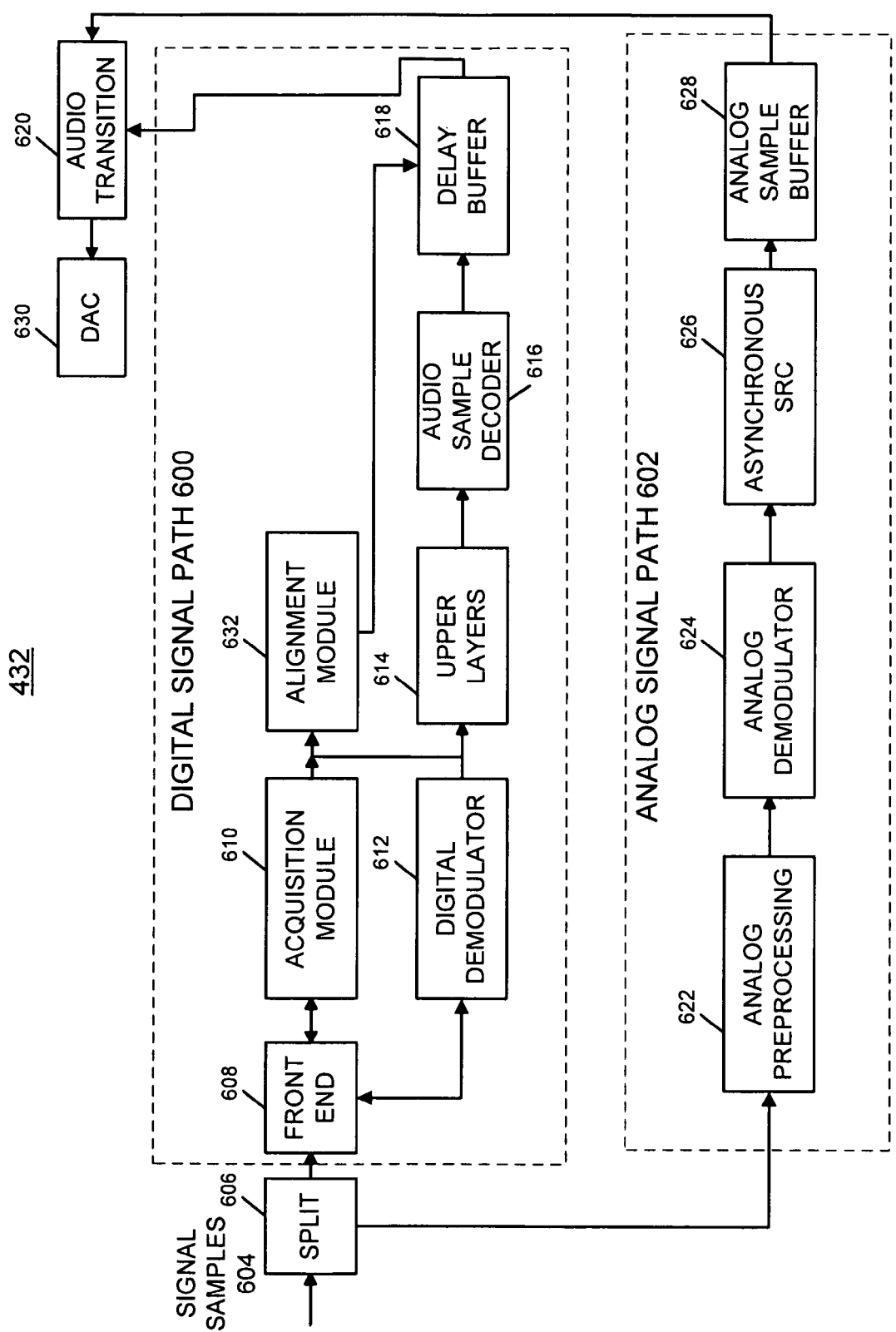
FIG. 9 illustrates a block diagram of an exemplary digital broadcast receiver in accordance with certain embodiments.

An exemplary functional block diagram of a process for aligning analog and digital audio signals is illustrated in FIG. 9. The functions illustrated in FIG. 9 can be performed in the baseband processor 432 of FIG. 6, for example, which can comprise a processing system that may include one or more processing units configured (e.g., programmed with software and/or firmware) to perform the functionality described herein, wherein the processing system of the baseband processor can be suitably coupled to any suitable memory (e.g., RAM, Flash ROM, ROM). For example, a semiconductor chip may be fabricated by known methods in the art to include a processing system that comprises one or more processors as well as a memory, e.g., the processing system and the memory may be arranged in a single semiconductor chip, if desired, according to known methods.

The signal samples 604 containing both the analog and digital portion enter a split module 606, where the baseband input signal is split into the digital signal path 600 and the analog signal path 602 via filters as would be known to one of skill in the art. In the digital path 600, the digital samples enter a front-end module 608, where the symbols comprising the digital signal are filtered and dispensed. The digital samples are also input into an acquisition module 610, which acquires or recovers OFDM symbol timing offset or error and carrier frequency offset or error from received OFDM symbols. The acquisition module also develops an acquisition symbol offset signal that adjusts the location of the pointer in the symbol dispenser of the front-end 608.

Figure 10A:
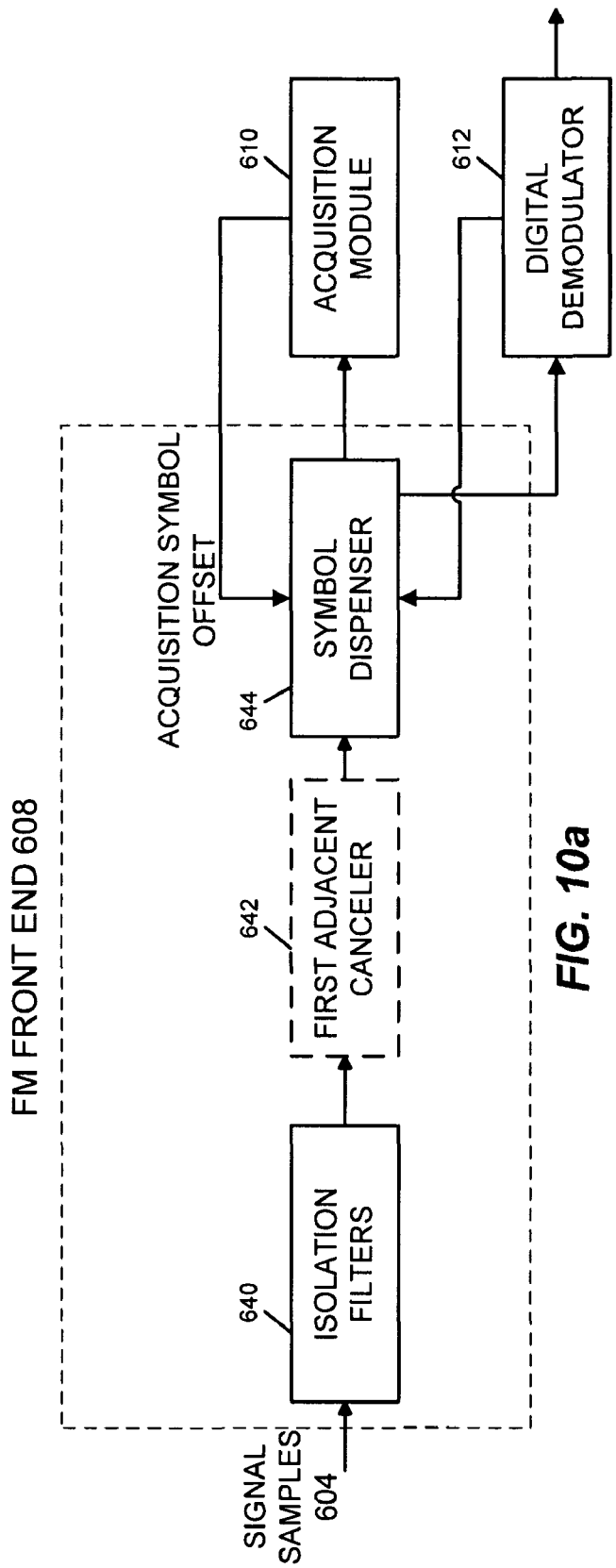
FIG. 10a illustrates a block diagram of an exemplary FM digital broadcast receiver in accordance with certain embodiments.
Figure 10B:
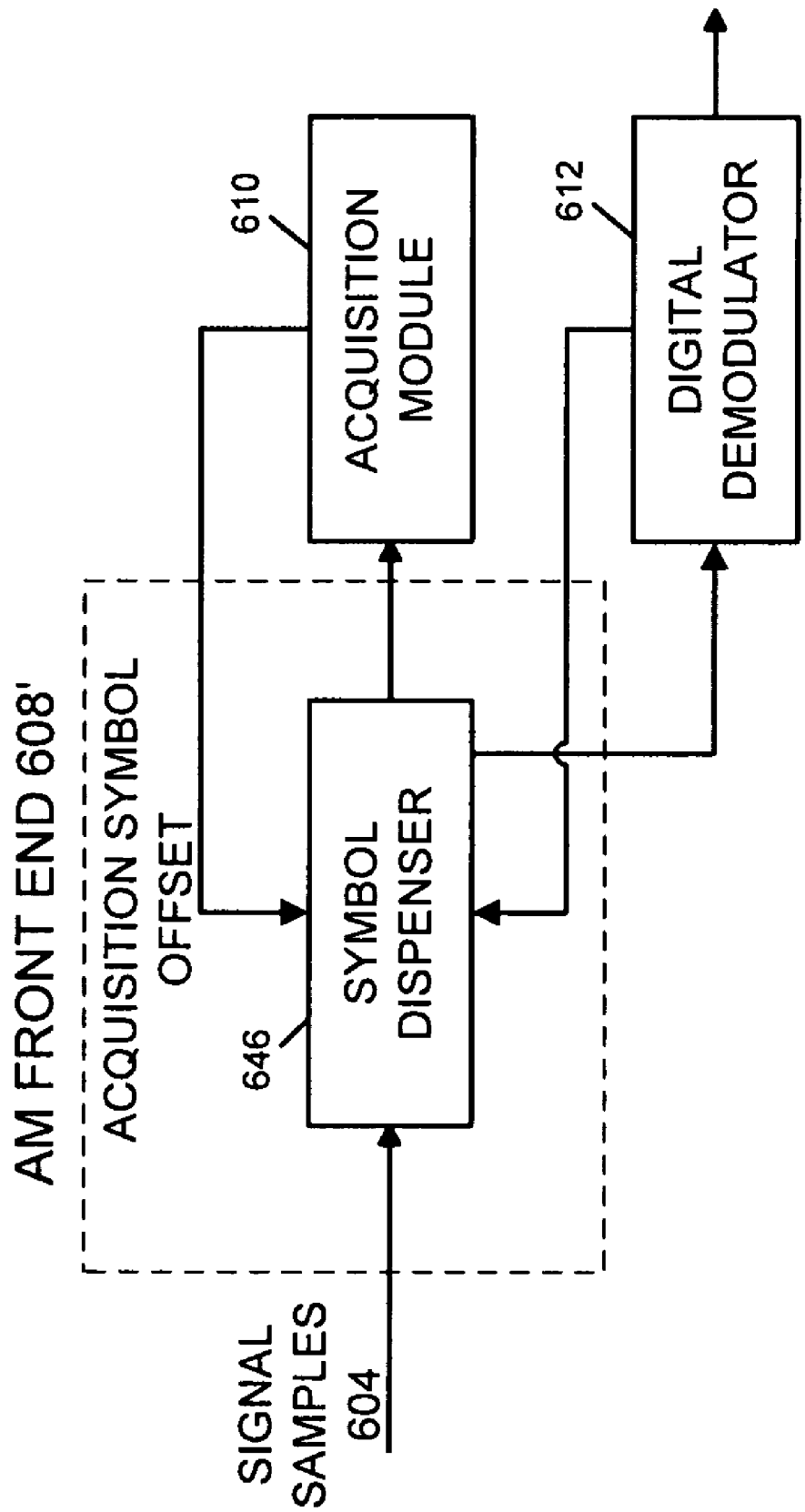
FIG. 10b illustrates a block diagram of an exemplary AM digital broadcast receiver in accordance with certain embodiments.

An exemplary FM front-end module 608 is illustrated in FIG. 10a. The signal samples from the digital portion enter an isolation filter 640 that filters and isolates the DAB upper and lower sidebands. Next, the signal may be passed through an optional first adjacent canceler 642, which can attenuate signals from adjacent FM signal bands that might interfere with the signal of interest. Then the signal enters the symbol dispenser, which is an accumulator of samples that may be, for example, a RAM buffer. When the acquisition module 610 indicates that it has acquired the digital signal, it adjusts the location of a sample pointer in the symbol dispenser 644 based on the acquisition time with an acquisition symbol offset. The symbol dispenser then calls the digital demodulator 612. An exemplary AM front-end module 608' is illustrated in FIG. 10b. The AM front-end module 608' is similar to the FM front-end module 608 except that it does not contain isolation filters or a first adjacent canceler.

A digital demodulator 612 then receives the digital signal and performs all the necessary operations of deinterleaving, code combining, FEC decoding, and error flagging of the received compressed audio data. The baseband signal is then passed to the upper layers module 614, which de-multiplexes the audio and data signals and performs audio transport decoding (e.g., Layer 2 and the audio transport portion of Layer 4 as described above in connection with FIG. 7).

The audio information from each modem frame is processed by an audio sample decoder 616. The audio sample decoder 616 decompresses the digital audio samples and outputs them to a delay buffer 618, where they are queued. The delay buffer 618 may be any suitable memory such as a first-in-first-out (FIFO) implemented in RAM. The delay buffer introduces a delay into the audio samples of an amount that is calculated in the alignment module 632 such that the leading edges of the digital audio samples are aligned with the equivalent analog samples.

The alignment module 632 calculates a delay amount that includes three different values: a coarse pre-decode delay, a fine delay, and an alignment value. The alignment module 632 typically determines the delay amount upon acquisition of a new signal, for example such as upon tuning the receiver to a new frequency or loss and subsequent reacquisition of a current signal. In the receiver, Layer 1 (e.g., the front-end 608, acquisition module 610, and digital demodulator 612) may operate at a different rate than the upper layers (e.g., the upper layers 614 and the audio sample decoder 616). Layer 1 processing times are typically dictated by the front-end interrupts (input) in samples/PDU while the upper layer processing times are dictated by the DAC interrupts (output) in packets. Since two different systems are driving the processing at two different time scales, it is desirable to put both on the same time scale. Thus an object of certain embodiments is to determine the amount of time data representing the first sample spends in Layer 1 until it reaches the interface of Layer 2. This is the point where the processing changes from sample/PDU to packets.

The coarse pre-decode delay is a predetermined constant value that includes the diversity delay and the constant processing delays in the receiver and is used to temporally align the audio samples from the digital signal with the audio samples from the analog signal in a granularity of +/−one audio frame. Accordingly, the value of the coarse pre-decode delay will be implementation specific but will typically be no less than the diversity delay and may be different for AM and FM modes. The fine delay is a predetermined constant value that includes constant processing delays in the receiver and is used to align the audio samples from the digital signal with audio samples from the analog signal with a granularity of audio samples. Accordingly, the value of the fine delay will also be implementation specific and may be different for AM and FM modes.

The alignment module 632 calculates the alignment value real-time and takes into account the variable processing delays in the receiver. The alignment value includes a number of components. First, it includes an ideal time for data representing a sample of the digital signal to travel from a point in the receiver to the DAC. This ideal time may be measured from, for example, the antenna 402, or ADC 418, or from any other point on the input side of the digital signal path. The ideal time is a predetermined value that is implementation specific and may be determined empirically. It may be stored in a memory, such as a RAM, ROM, or Flash ROM, and retrieved by the alignment module 632 for the purpose of performing the alignment value calculation. It should be noted that since the delays in the receiver prior to the digital signal path are constant, the choice of the measuring point is a matter of implementation.

Second, the alignment value includes an interface time. This represents the amount of time it takes for data corresponding to the first sample in the digital signal path to travel from the input of the digital signal path to the input of the digital demodulator. To determine the alignment value, the alignment module records the time when there is enough data present for demodulation of the first digital symbol, i.e., when the acquisition module indicates that it has acquired the signal. To obtain the alignment value, the alignment module records the clock time when an interrupt is generated by the acquisition module. The alignment module then takes into account acquisition sample slips, symbol correction, and clock tracking values. An exemplary equation for the acquisition time is:

Acquisition Time=(symbol size−delay samples during acquisition)*(*BB* clock/timer clock)

where the symbol size is the OFDM symbol duration, the delay samples during acquisition is the duration of the acquisition sample slips, the BB clock is the baseband clock rate (e.g., 372 kHz), and the timer clock is a high resolution clock derived from a local receiver reference clock that can be used for the purposes of sample alignment (e.g., 70.560 MHz). The acquisition time is variable because there is typically a shift in sample location during acquisition. For example, if X is the initial sample location and the time from the antenna to the DAC is constant, then the sample location could be shifted to X+10 due to acquisition. The symbol correction value is supplied by the control and tracking module (not shown) as described in U.S. Pat. No. 6,891,898. The acquisition module in concert with the control and tracking module permit the accurate recovery of overall symbol timing and carrier frequency by the receiver. The baseband processor 432 also calculates the clock tracking values for the audio samples based on the difference between the local reference clock and the transmitter reference clock. Based on the time of the acquisition module interrupt, the acquisition time, the symbol correction value, and the clock tracking values, the alignment module calculates the amount of time that data representing a sample of the digital signal took to travel from a point in the receiver to the DAC. This time may be measured from, for example, the antenna 402, or ADC 418, or from any other point on the input side of the digital signal path but will typically be measured from the same reference point as the ideal time.

Third, the alignment value includes an offset to account for the state of the DAC FIFO buffer. This is a time representing the length of time from when data representing the first digital sample has reached the input of the digital signal path until the first audio interrupt after the first sample has reached the input of a layer two interface. This time may be measured from, for example, the antenna 402, or ADC 418, or from any other point on the input side of the digital signal path but will typically be measured from the same reference point as the ideal time and the interface time. In typical embodiments, the audio output is at a sample rate of 44.1 kHz. For example, assume that DAC output is every 2048 samples. With a DAC FIFO buffer of 64 words, a DAC interrupt would occur after 2048/64=32 FIFO buffer interrupts. It should be noted that the DAC interrupt corresponds to the initial sample of a full audio frame of decoded analog or digital samples.

The alignment module 632 can determine this offset in a few different ways. For example, the alignment module 632 can record the time when data representing the first digital sample reaches the interface to the upper layers 614, retrieve the state of the DAC (i.e., number of samples in the DAC FIFO buffer), and then calculate the amount of time until the DAC FIFO buffer will be full based on the constant sample rate (e.g., 44.1 kHz). Alternatively, the alignment module 632 could set a flag when data representing the first digital sample reaches the interface to the upper layers 614, and then determine the alignment value at the next time when the DAC FIFO buffer is full (i.e., upon the next DAC interrupt). In certain embodiments in which the DAC is not located on the same chip as the digital signal path, this offset may not be included because the DAC can be easily reset to zero. However, in certain embodiments in which the DAC is co-located with the digital signal path (e.g., on the same chip) this offset will be included because the DAC may not be easily controlled independently of the digital signal path.

To determine the alignment value, the alignment module 632 obtains the ideal time, the interface time, and, in certain embodiments, the offset to account for the state of the DAC FIFO buffer. The alignment module then adds the ideal time to the interface time, and subtracts the offset. In certain embodiments, it may be desirable to add a value to account for the fixed point implementation round-off errors. Once the alignment module determines the amount of the delay in units of time (e.g., msec or µsec), this value can be converted to samples by multiplying by a conversion ratio. For example, if each sample has a duration of approximately 22.67 µsec, then the ratio would be 1/22.67 µsec.

Once the alignment module 632 determines the delay amount based on the coarse pre-decode delay, fine delay, and alignment value, it inserts a delay into the delay buffer 618 by adjusting a read pointer in the buffer by the delay amount. The delay amount in samples can be positive or negative up to the size of a full audio frame (e.g., +/−1024, or 2048 samples). The delayed audio samples from the digital signal path are then outputted to the audio transition module 620 as digital audio frames.

The samples from the analog portion of the signal exit the split module 606 and enter an analog preprocessing circuit 622 that performs initial processing of the samples, e.g., sample buffering and noise filtering. The samples then enter an analog demodulator 624, where they are demodulated into analog audio samples. Next, the analog audio samples enter an asynchronous sample rate converter (SRC) 626 where the sample rate of the analog audio samples based on the receiver's reference clock is adjusted to match the transmitter's reference clock as obtained from the digital demodulator 612. The analog audio samples then pass through an analog sample buffer 628 where the analog audio samples may be framed into analog audio frames of, for example, 1024 or 2048 audio stereo samples, and are then inputted into the audio transition module 620.

The audio transition module 620 then digitally combines the analog audio frames with the realigned digital audio frames, when available. A transition control signal is input to the audio transition module to control the audio frame combination. This transition control signal controls the relative amounts of the analog and digital portions of the signal that are used to form the output. Typically the transition control signal is responsive to some measurement of degradation of the digital portion of the signal. The technique used to generate a transition control signal for blending is not a part of this disclosure, however, U.S. Pat. No. 6,178,317 describes such a method for producing a blend control signal. The audio transition module 620 then outputs the digitally combined signal to the DAC 630, where it is converted into analog audio for rendering.

The audio transition function described herein incorporates the diversity delay implemented in DAB IBOC systems. The exemplary embodiments include audio sample rate alignment with a 44.1 kHz clock derived from the receiver's front-end clock. The alignment can accommodate a virtual 44.1 kHz transmitter clock which is synchronous with the transmitted digital radio broadcast digital signal. Although the transmitter and local receiver clocks are nominally designed for 44.1 kHz audio sample rate, physical clock tolerances result in an error which should be accommodated at the receiver. The maintenance of synchronization between the receiver and the transmitter clock is not a part of this disclosure but is desirable in maintaining alignment of the audio samples. Additionally, processing times in the symbol acquisition module may be variable. Furthermore, the processing in Layer 1 may operate at a different rate than the upper layers (e.g., codec and data layers) since Layer 1 processing is dictated by Layer 1 interrupts while the upper layers processing is driven by DAC interrupts. The method of alignment involves delaying the digital audio signal in real-time to accommodate these clock and processing time errors.

Figure 11:
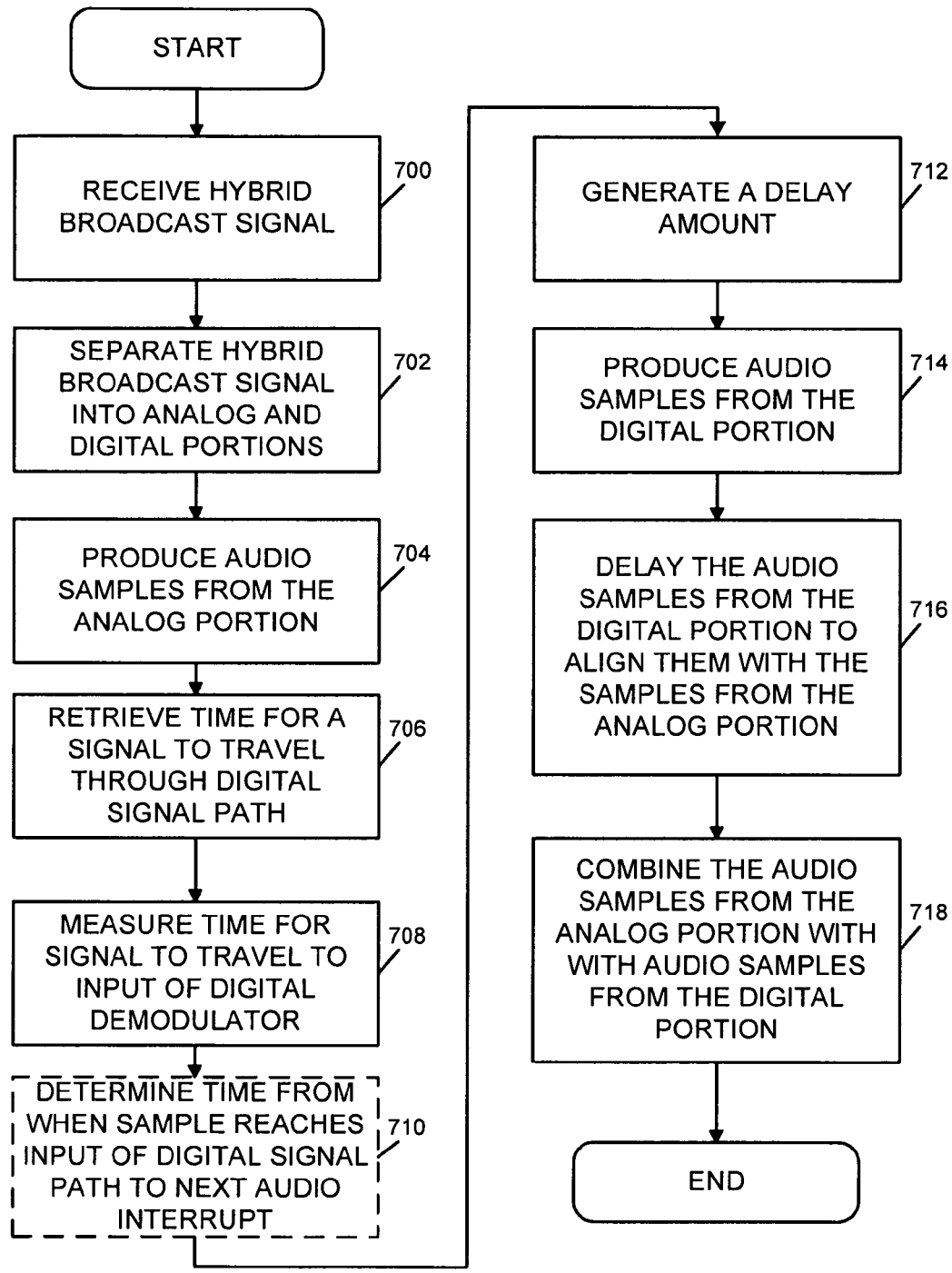
FIG. 11 illustrates an exemplary process of temporally aligning audio samples of a digital portion of a radio broadcast signal with audio samples of an analog portion of the radio broadcast signal.

FIG. 11 illustrates an exemplary process for temporally aligning audio samples of the digital portion of the radio broadcast signal with audio samples of the analog portion of the radio broadcast signal. In certain embodiments, the radio broadcast signal may be an in-band on-channel digital radio broadcast signal. First, the receiver receives a radio broadcast signal having an analog portion and a digital portion in step 700. The analog portion may be, for example, AM or FM, and the digital portion may be, for example, OFDM. Next, a split module 606 separates the analog portion of the radio broadcast signal from the digital portion of the radio broadcast signal in step 702. Then an analog signal path 602 produces a first plurality of audio samples representative of the analog portion of the radio broadcast signal in step 704.

An alignment module 632 then determines an amount of delay for the audio samples of the digital portion such that they can be temporally aligned with audio samples from the analog portion. The alignment module 632 retrieves from a memory, such as a RAM, ROM, or Flash ROM, a stored first time interval corresponding to an approximate time for data representing a first sample of the digital portion to travel through a digital signal path in a receiver, wherein the digital signal path includes a digital demodulator in step 706. The alignment module 632 also measures a second time interval for data representing the first sample of the digital portion to travel from an input of the digital signal path to an input of the digital demodulator in step 708. In certain embodiments shown as optional step 710, the alignment module 632 determines a third time corresponding to a length of time from when data representing the first sample has reached the input of the digital signal path until a next audio interrupt after the first sample has reached the input of a layer two interface, wherein the audio interrupt corresponds to an initial sample of a full audio frame of decoded analog or digital samples.

The alignment module 632 then generates a delay amount for delaying a second plurality of audio samples relative to the first plurality of audio samples such that the second plurality of audio samples is temporally aligned with the first plurality of audio samples by adding the first time to the second time in step 712. In certain embodiments, the alignment module 632 also subtracts the third time from the sum of the first and second times. In certain embodiments, the delay amount may be represented by a number of samples, (e.g., +/-1024 or 2048 samples).

The digital signal path produces the second plurality of audio samples representative of the digital portion of the radio broadcast signal in step 714, which are delayed in the delay buffer 618 in step 716 by the delay amount such that the second plurality of audio samples is temporally aligned to within a predetermined amount with the first plurality of audio samples in step 714. The predetermined amount may be, for example, ±three audio samples. Other predetermined amounts may be suitable depending on the implementation. The delay may be implemented by, for example, adjusting a read pointer in the delay buffer 618. Finally, in step 718 an audio transition module 620 digitally combines the first plurality of audio samples with the second plurality of audio samples to produce a combined audio output.

The previously described embodiments of the present disclosure have advantages. One advantage is that in certain embodiments, the fine time alignment of the digital portion of a hybrid radio broadcast signal with the analog portion of the radio broadcast may be performed to within +/-three samples accuracy.

Another advantage is that in certain embodiments, the fine time alignment of the digital portion of a hybrid radio broadcast signal with the analog portion of the radio broadcast may be performed in real-time without requiring intensive processor operations such as interpolation.

The exemplary approaches described may be carried out using any suitable combinations of software, firmware and hardware and are not limited to any particular combinations of such. Computer program instructions for implementing the exemplary approaches described herein may be embodied on a tangible computer-readable medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method for temporally aligning audio samples of a digital portion of a radio broadcast signal with audio samples of an analog portion of the radio broadcast signal, the method comprising the steps of:
receiving a radio broadcast signal having an analog portion and a digital portion;
separating the analog portion of the radio broadcast signal from the digital portion of the radio broadcast signal;
producing a first plurality of audio samples representative of the analog portion of the radio broadcast signal;
retrieving from a memory a stored first time interval corresponding to an approximate time for data representing a first sample of the digital portion to travel through a digital signal path in a receiver, wherein the digital signal path includes a digital demodulator;
measuring a second time for data representing the first sample of the digital portion to travel from an input of the digital signal path to an input of the digital demodulator;
generating a delay amount for delaying a second plurality of audio samples relative to the first plurality of audio samples such that the second plurality of audio samples is temporally aligned with the first plurality of audio samples by adding the first time to the second time;
producing the second plurality of audio samples representative of the digital portion of the radio broadcast signal;
delaying the second plurality of audio samples by the delay amount such that the second plurality of audio samples is temporally aligned to within a predetermined amount with the first plurality of audio samples; and
digitally combining the first plurality of audio samples with the second plurality of audio samples to produce a combined audio output.

2. The method of claim 1 further comprising the step of:
determining a third time corresponding to a length of time from when data representing the first sample has reached the input of the digital signal path until a next audio interrupt after the first sample has reached the input of a layer two interface, wherein the audio interrupt corresponds to an initial sample of a full audio frame of decoded analog or digital samples; and
wherein generating the delay amount includes subtracting the third time.

3. The method of claim 1 wherein the radio broadcast signal is an in-band-on-channel digital radio signal.

4. The method of claim 1 wherein the analog signal is a frequency modulated signal.

5. The method of claim 1 wherein the analog signal is an amplitude-modulated signal.

6. The method of claim 1 wherein delaying the second plurality of audio samples comprises adjusting a read pointer in a delay buffer.

7. The method of claim 1 wherein the delay amount is represented by a number of samples.

8. A system for temporally aligning audio samples of a digital portion of a radio broadcast signal with audio samples of an analog portion of the radio broadcast signal comprising:
a processing system; and
a memory coupled to the processing system, wherein the processing system is configured to execute steps comprising:
receiving a radio broadcast signal having an analog portion and a digital portion;
separating the analog portion of the radio broadcast signal from the digital portion of the radio broadcast signal;
producing a first plurality of audio samples representative of the analog portion of the radio broadcast signal;
retrieving from a memory a stored first time interval corresponding to an approximate time for data representing a first sample of the digital portion to travel through a digital signal path in a receiver, wherein the digital signal path includes a digital demodulator;
measuring a second time for data representing the first sample of the digital portion to travel from an input of the digital signal path to an input of the digital demodulator;
generating a delay amount for delaying a second plurality of audio samples relative to the first plurality of audio samples such that the second plurality of audio samples is temporally aligned with the first plurality of audio samples by adding the first time to the second time;
producing the second plurality of audio samples representative of the digital portion of the radio broadcast signal;
delaying the second plurality of audio samples by the delay amount such that the second plurality of audio samples is temporally aligned to within a predetermined amount with the first plurality of audio samples; and
digitally combining the first plurality of audio samples with the second plurality of audio samples to produce a combined audio output.

9. The system of claim 8 further comprising the step of:
determining a third time corresponding to a length of time from when data representing the first sample has reached the input of the digital signal path until a next audio interrupt after the first sample has reached the input of a layer two interface, wherein the audio interrupt corresponds to an initial sample of a full audio frame of decoded analog or digital samples; and
wherein generating the delay amount includes subtracting the third time.

10. The system of claim 8 wherein the radio broadcast signal is an in-band-on-channel digital radio signal.

11. The system of claim 8 wherein the analog signal is a frequency modulated signal.

12. The system of claim 8 wherein the analog signal is an amplitude-modulated signal.

13. The system of claim 8 wherein delaying the second plurality of audio samples comprises adjusting a read pointer in a delay buffer.

14. The system of claim 8 wherein the delay amount is represented by a number of samples.

15. A non-transitory, tangible computer readable medium comprising computer program instructions adapted to cause a processing system to execute steps comprising:
receiving a radio broadcast signal having an analog portion and a digital portion;
separating the analog portion of the radio broadcast signal from the digital portion of the radio broadcast signal;
producing a first plurality of audio samples representative of the analog portion of the radio broadcast signal;
retrieving from a memory a stored first time interval corresponding to an approximate time for data representing a first sample of the digital portion to travel through a digital signal path in a receiver, wherein the digital signal path includes a digital demodulator;
measuring a second time for data representing the first sample of the digital portion to travel from an input of the digital signal path to an input of the digital demodulator;
generating a delay amount for delaying a second plurality of audio samples relative to the first plurality of audio samples such that the second plurality of audio samples is temporally aligned with the first plurality of audio samples by adding the first time to the second time;

producing the second plurality of audio samples representative of the digital portion of the radio broadcast signal;

delaying the second plurality of audio samples by the delay amount such that the second plurality of audio samples is temporally aligned to within a predetermined amount with the first plurality of audio samples; and digitally combining the first plurality of audio samples with the second plurality of audio samples to produce a combined audio output.

16. The computer readable medium of claim 15 further comprising the step of:

determining a third time corresponding to a length of time from when data representing the first sample has reached the input of the digital signal path until a next audio interrupt after the first sample has reached the input of a layer two interface, wherein the audio interrupt corresponds to an initial sample of a full audio frame of decoded analog or digital samples; and wherein generating the delay amount includes subtracting the third time.

17. The computer readable medium of claim 15 wherein the radio broadcast signal is an in-band-on-channel digital radio signal.

18. The computer readable medium of claim 15 wherein the analog signal is a frequency modulated signal.

19. The computer readable medium of claim 15 wherein the analog signal is an amplitude-modulated signal.

20. The computer readable medium of claim 15 wherein delaying the second plurality of audio samples comprises adjusting a read pointer in a delay buffer.

21. The computer readable medium of claim 15 wherein the delay amount is represented by a number of samples.

* * * * *